United States Patent
Chang et al.

(10) Patent No.: US 7,068,815 B2
(45) Date of Patent: Jun. 27, 2006

(54) METHOD AND APPARATUS FOR GROUND DETECTION AND REMOVAL IN VISION SYSTEMS

(75) Inventors: Peng Chang, Pittsburgh, PA (US); David Hirvonen, Portland, OR (US); Theodore Armand Camus, Mount Laurel, NJ (US)

(73) Assignee: Sarnoff Corporation, Princeton, NJ (US)

(*) Notice: Subject to any disclaimer, the term of this patent is extended or adjusted under 35 U.S.C. 154(b) by 0 days.

(21) Appl. No.: 10/813,768

(22) Filed: Mar. 31, 2004

(65) Prior Publication Data

US 2004/0252864 A1 Dec. 16, 2004

Related U.S. Application Data

(63) Continuation-in-part of application No. 10/766,976, filed on Jan. 29, 2004, and a continuation-in-part of application No. 10/461,699, filed on Jun. 13, 2003.

(60) Provisional application No. 60/484,462, filed on Jul. 2, 2003.

(51) Int. Cl.
*G06K 9/00* (2006.01)

(52) U.S. Cl. .................. 382/106; 382/103; 382/107

(58) Field of Classification Search ............ 382/103, 382/104, 106, 154, 285, 291, 107; 356/3, 356/3.02, 3.08, 3.11, 3.13, 3.14, 3.16, 4.01, 356/4.06, 12, 611; 702/166, 5, 16; 340/854.1, 340/435, 686.6, 937; 701/208; 348/140; 359/458, 462, 470; 342/180; 33/20.4; 409/115
See application file for complete search history.

(56) References Cited

U.S. PATENT DOCUMENTS

| | | | |
|---|---|---|---|
| 4,695,959 A * | 9/1987 | Lees et al. ............. | 701/225 |
| 5,109,425 A * | 4/1992 | Lawton ............... | 382/107 |
| 5,563,988 A * | 10/1996 | Maes et al. .......... | 345/421 |
| 5,581,638 A * | 12/1996 | Givens et al. ......... | 382/294 |
| 5,745,126 A * | 4/1998 | Jain et al. ............ | 382/154 |
| 6,169,516 B1 * | 1/2001 | Watanabe et al. ..... | 342/357.13 |
| 6,421,463 B1 * | 7/2002 | Poggio et al. ......... | 382/224 |
| 6,658,136 B1 * | 12/2003 | Brumitt ............... | 382/103 |
| 2002/0038181 A1 * | 3/2002 | Okude et al. ......... | 701/208 |
| 2002/0183906 A1 * | 12/2002 | Ikeda ................ | 701/36 |
| 2003/0048930 A1 * | 3/2003 | Mihara et al. ......... | 382/118 |
| 2003/0112132 A1 * | 6/2003 | Trajkovic et al. ...... | 340/435 |
| 2003/0139865 A1 * | 7/2003 | Prakah-Asante et al. | 701/45 |
| 2003/0169906 A1 * | 9/2003 | Gokturk et al. ........ | 382/115 |
| 2004/0223630 A1 * | 11/2004 | Waupotitsch et al. ... | 382/118 |

* cited by examiner

*Primary Examiner*—Andrew W. Johns
*Assistant Examiner*—Patrick Edwards
(74) *Attorney, Agent, or Firm*—Lowenstein Sandler PC

(57) ABSTRACT

A vision system that forms a map of a scene proximate a platform, e.g., a vehicle, that determines the actual ground plane form the map, and that corrects the map for differences between the actual ground plane and an assumed ground plane. The vision system may remove the actual ground plane from the map to prevent false positives. The vision system can further identify and classify objects and, if appropriate, take evasive action.

10 Claims, 4 Drawing Sheets

METHOD AND APPARATUS FOR GROUND DETECTION AND REMOVAL IN VISION SYSTEMS

This application claims the benefit of U.S. provisional patent application No. 60/484,462, filed Jul. 2, 2003, entitled, "Ground Detection, Correction, and Removal In Depth Images" by Chang et al., which is herein incorporated by reference.

This application is a continuation-in-part of pending U.S. patent application Ser. No. 10/461,699, filed on Jun. 13, 2003, entitled, "Vehicular Vision System" by Camus et al. That patent application is hereby incorporated by reference in its entirety.

This application is a continuation-in-part of pending U.S. patent application Ser. No. 10/766,976, filed on Jan. 29, 2004, entitled, "Stereo-Vision Based Imminent Collision Detection" by Chang et al. That patent application is hereby incorporated by reference in its entirety.

BACKGROUND OF THE INVENTION

1. Field of the Invention

The present invention relates to artificial or computer vision systems, e.g. vehicular vision systems such as those used in collision avoidance systems. In particular, this invention relates to a method and apparatus for detecting and removing the ground from scene images.

2. Description of the Related Art

Collision avoidance systems utilize some type of a sensor system to detect objects in front of an automobile or other form of a platform. Some prior art sensor systems have used radar and/or infrared sensors to generate rudimentary images of scenes in front of a vehicle. By processing that imagery, objects can be detected.

Recently, stereo cameras sensor systems that process 2-D camera images into a depth map have become of interest. By comparing pre-rendered 3-D vehicle templates against the depth map objects can be identified. In such systems the pitch angle of the stereo cameras relative to the ground plane is critical. This is because vertical positions in the depth map are largely determined by the camera pitch angle. If the camera pitch angle is incorrect, such as when the pitch angle changes due to vehicle dynamics (e.g., hitting a pothole), the pre-rendered templates match incorrectly with the depth map. This can result in either false positives (typically, attempting to match too low, i.e. into the ground) or false negatives (typically, attempting to match too high, i.e. into the sky).

Another problem can result if the stereo camera-to-ground plane calibration is accurate, but the host vehicle is approaching a slope, hill or even a bump in the road. Then, the calibration ground plane does not match the road surface ground plane. In such cases the camera-to-ground plane calibration can be dynamically adjusted to compensate for the difference, eliminating false positives and false negatives. In the case of an embankment or other impassable obstruction, there is no need to attempt to match vehicle templates against the road surface. Doing so is computationally inefficient and may create false positives.

Therefore, a vision system that detects the ground would be useful. Also useful would be a vision system that detects the ground and that compensates for differences between the actual ground plane and the assumed (or calibrated) depth map ground plane. A vision system that detects the ground and that removes the ground from the depth map would also be useful, since the ground is usually not considered a threatening object.

SUMMARY OF THE INVENTION

Embodiments of the present invention provide for vision systems that detect the ground. Some embodiments of the present invention compensate for differences between the actual ground plane and an assumed ground plane. Some embodiments of the present invention detect the ground plane and remove the ground plane from further consideration by the vision system.

Embodiments of the present invention incorporate vision systems that identify and classify objects (targets) located proximate a platform (e.g., a vehicle). Such a vision system includes a stereo camera pair that produces imagery that is processed to generate depth maps (or depth images) of a scene proximate the platform. The system identifies the ground and then corrects the depth map by compensating the depth map for differences between the actual ground plane and an assumed ground plane, and/or by identifying or removing pixels corresponding to the ground from the depth map.

In some embodiments a target list is produced by matching pre-rendered templates to the depth map imagery. The pre-rendered templates are not matched into the identified ground. The target list is then processed to produce target size and classification estimates. Targets near the platform are tracked and their velocities are determined. Target information may be displayed to a user, or the target information may be used for a predetermined purpose, such as obstacle avoidance or damage or injury mitigation.

BRIEF DESCRIPTION OF THE DRAWINGS

So that the manner in which the above recited features of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

The principles of the present invention provide for detecting the ground and the ground plane in a map, for example a depth map produced from imagery from a stereo camera pair. The principles of the present invention further provide for processing that map to accomplish objectives such as vehicle detection and tracking. Although the present invention is described in the context of stereo cameras mounted on a vehicle, the principles of the present invention can be used with other types of platforms, such as vessels, airplanes, other types of moving equipment, and, in some applications, even stationary platforms such as docks.

Figure 1:
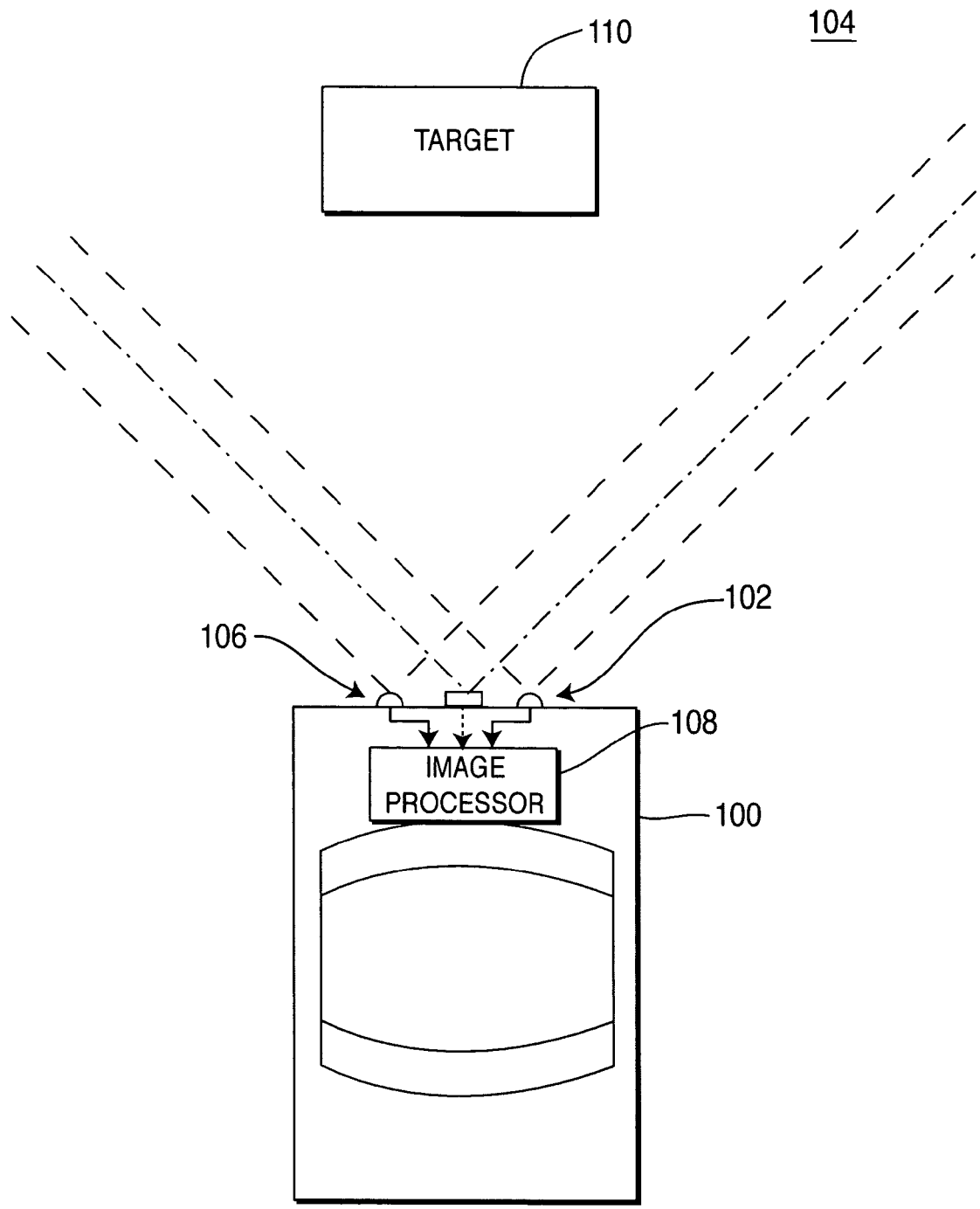
FIG. 1 depicts a schematic view of a vehicle utilizing the present invention.

FIG. 1 depicts a schematic diagram of a host vehicle 100 (generically, a platform) having a vision system 102 that images a scene 104 that is proximate the host vehicle 100. While FIG. 1 shows an imaged scene 104 in front of the host vehicle 100, other applications may image scenes that are behind or to the side of a platform. The vision system 102 comprises a sensor array 106 that is coupled to an image processor 108. The sensors within the sensor array 106 have a field of view that images one or more targets 110.

Figure 2:
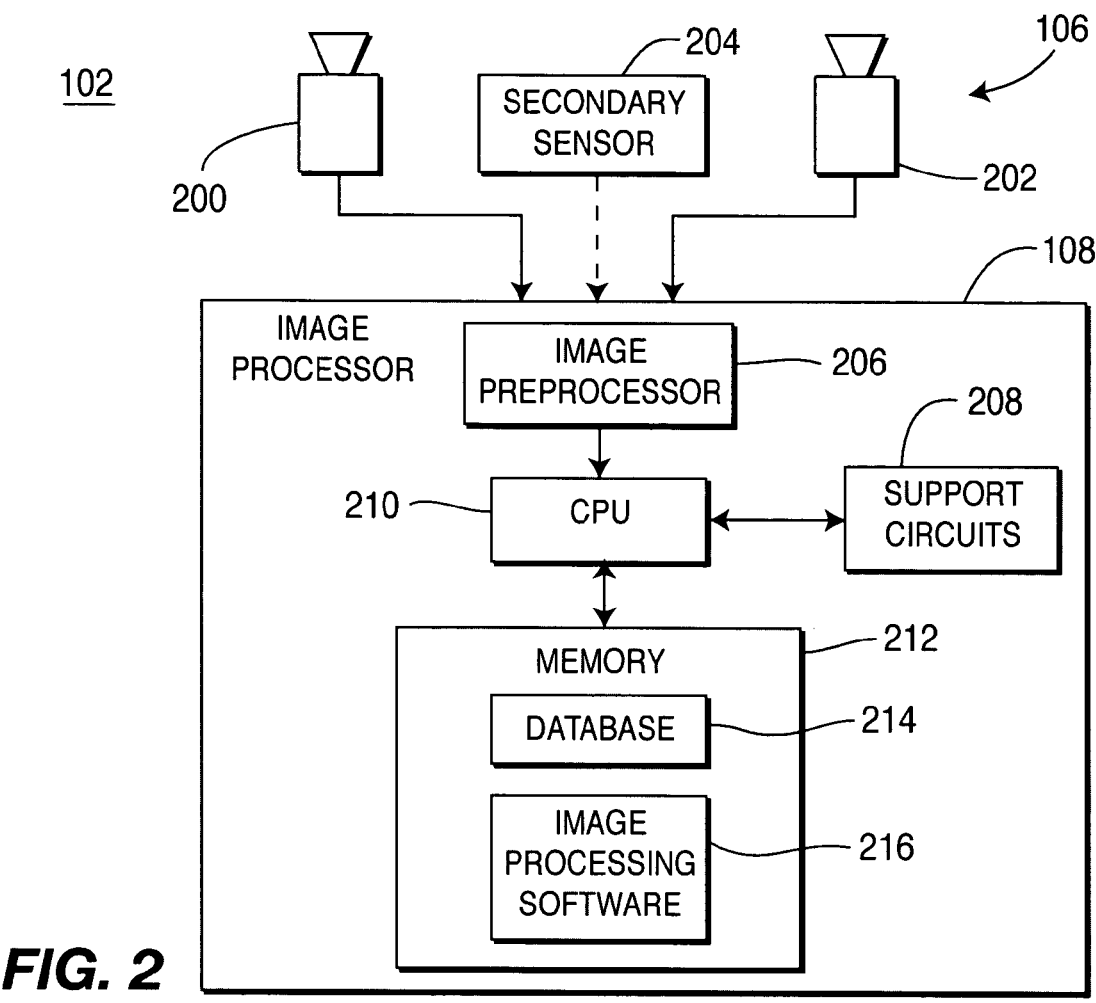
FIG. 2 depicts a block diagram of vision system hardware.

FIG. 2 depicts a block diagram of the vision system 102 hardware. The sensor array 106 comprises a pair of stereo cameras 200 and 202 and an optional secondary sensor 204. The secondary sensor 204 may be a radar transceiver, a LIDAR transceiver, an infrared range finder, sonar range finder, and the like. The stereo cameras 200 and 202 generally operate in the visible wavelengths, but may be augmented with infrared sensors, or they may be infrared sensors themselves without operating in the visible range. The stereo cameras 200 and 202 have a fixed relation to one another and produce a depth image of the scene 104.

The secondary sensor 204 may provide additional information regarding the position of an object, the velocity of the object, the size or angular width of the object, etc., such that a target template search process can be limited to templates of objects at known positions relative to the host vehicle 100, objects that lie within a range of known velocities or relative velocities, etc. If the secondary sensor 204 is a radar, the secondary sensor 204 can, for example, provide an estimate of object position and relative velocity.

The image processor 108 comprises an image preprocessor 206, a central processing unit (CPU) 210, support circuits 208, and memory 212. The image preprocessor 206 generally comprises circuitry for capturing, digitizing and processing the imagery from the sensor array 106. The image preprocessor may be a single chip video processor such as the processor manufactured under the model Acadia I™ by Pyramid Vision Technologies of Princeton, N.J.

The processed images from the image preprocessor 206 are coupled to the CPU 210. The CPU 210 may comprise any one of a number of presently available high speed microcontrollers or microprocessors. The CPU 210 is supported by support circuits 208 that are generally well known. These circuits include cache, power supplies, clock circuits, input-output circuitry, and the like. Memory 212 is coupled to the CPU 210. Memory 212 stores certain software routines that are executed by the CPU 210 to facilitate operation of the invention. The memory 212 also stores certain databases 214 of information that are used by the invention and stores the image processing software 216 that is used to process the imagery from the sensor array 106. The memory 212 is one form of a computer readable medium, but other computer readable media such as an optical disk, a disk drive, or a floppy disk, can also be employed with the present invention. Although the invention is described in the context of a series of method steps, the invention may be performed in hardware, software, or some combination of hardware and software.

Figure 3:
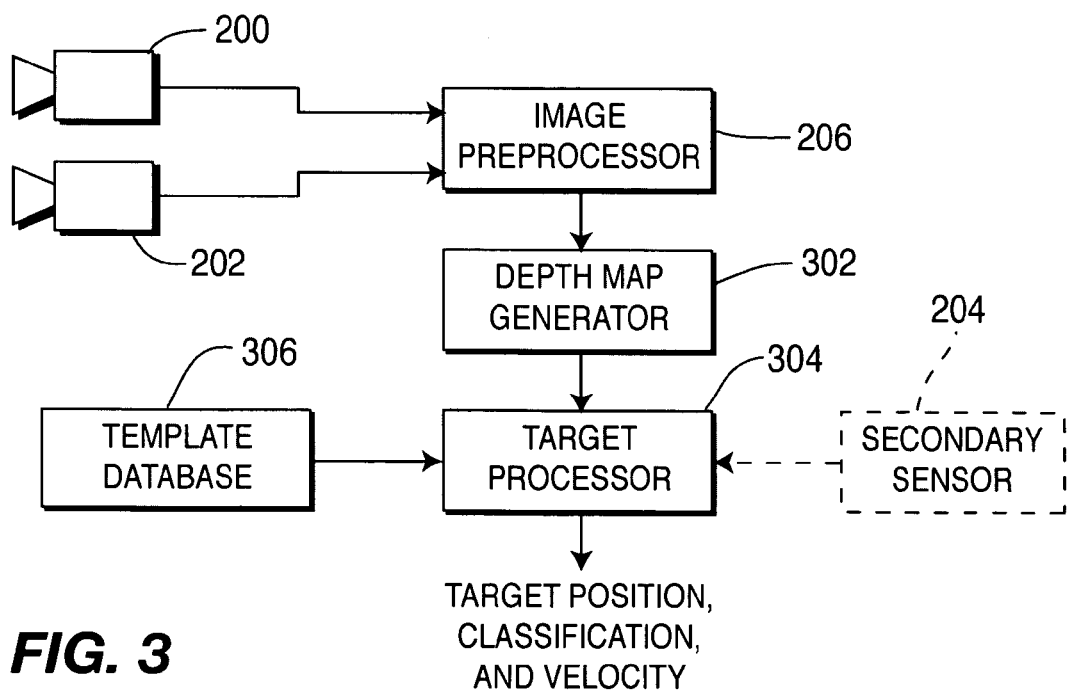
FIG. 3 depicts a block diagram of the functional modules of the vision system of FIG. 2.

FIG. 3 is a block diagram of the functional modules that are used to implement the present invention. The cameras 200 and 202 provide stereo imagery to the image preprocessor 206. The image preprocessor 206 provides input to a depth map generator 302, which is coupled to a target processor 304. The target processor 304 also receives information from a template database 306 and from the optional secondary sensor 204. The target processor 304 produces a target list that is then used to identify target size and classification estimates that enable target tracking and the identification of each target's position, classification and velocity or relative velocity within the scene. That information may then be used to avoid collisions with each target or perform pre-crash alterations to the vehicle to mitigate or eliminate damage or injury (e.g., lower or raise the vehicle, tighten seatbelts, deploy air bags and the like).

The image preprocessor 206 performs such functions as capturing and digitizing the stereo imagery, warping the stereo image into alignment, and pyramid wavelet decomposition to create multi-resolution disparity images. Each disparity image contains a point-wise computed disparity between images from the left stereo camera and the right stereo camera. The greater the computed disparity of an imaged object, the closer the object is to the sensor array. Thus, the functions of the image preprocessor 206 depend on accurate calibration information such as the distance between the stereo cameras 200 and 202 and the plane of the stereo cameras. The distance between the stereo cameras is very important for computing disparity, while the plane is important to determining real-world locations from the stereo camera imagery.

The depth map generator 302 processes the multi-resolution disparity images to form a two-dimensional depth map. The depth map contains image points or pixels in a two dimensional array, wherein each image point represents a specific distance from the sensor array 106 to a specific location within the scene 104. The depth map is then processed by the target processor 304 using templates (models) of typical objects that might be encountered by the vision system and which are compared to the information within the depth map. As described below, the template database 306 comprises templates of objects (e.g., automobiles) located at various positions and depth with respect to the sensor array 106. An exhaustive search of the template database may be performed to identify a template that most closely matches the present depth image.

A problem that occurs when matching templates is that the host vehicle 100 may not lie on the same ground plane when the vision system 102 is operating as when the vision system 102 was calibrated. Thus, the actual pitch, yaw, and roll angles of the cameras relative to the assumed calibration ground plane causes determinations of vertical positions and orientations of objects in the scene 104 to be skewed. Thus, it becomes difficult to match the pre-rendered 3-D templates in the template database with the objects in the depth map. Pitch problems are particularly problematic in that the sensor array 106 can be directed downward into the ground, which tends to cause false positives, or skyward, which tends to cause false negatives. Pitch problems can be caused by changes due to vehicle dynamics, such as hitting a pothole or going up or down an incline, or by terrain changes such as when the host vehicle approaches or travels on a slope, hill or on a bump in the road. The principles of the present invention are useful in correcting or mitigating problems caused by changes in the host vehicle planes from that during calibration.

Figure 4:
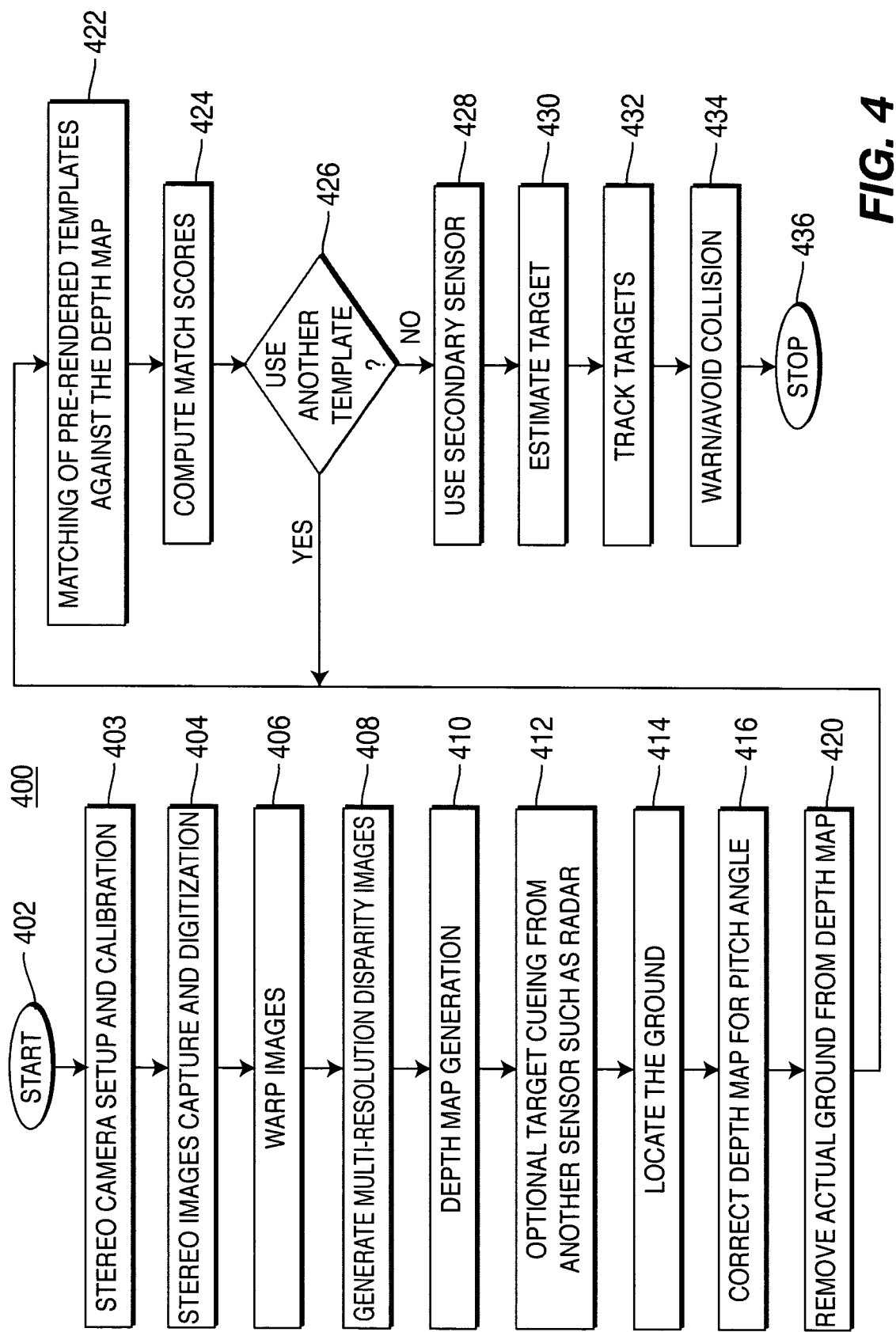
FIG. 4 depicts a flow diagram of the operation of the vision system of FIG. 2.

FIG. 4 depicts a flow diagram of a method 400 showing the operation of the present invention. The method 400 starts at step 402 and proceeds at step 403 with the setup and calibration of the stereo cameras 200 and 202. In particular, the separation between the stereo cameras and their plane is determined. At step 404, the method captures and digitizes the stereo images from the stereo cameras 200 and 202. At step 406, the stereo imagery generated from the cameras is warped into alignment to facilitate producing disparity images. At step 408, the method 400 generates multi-resolution disparity images from the stereo camera imagery, e.g. using pyramid wavelet decomposition. A multi-resolution disparity image is created for each pair of frames generated by the stereo cameras 200 and 202. The disparity image may comprise, in addition to the disparity information, an indication of which of the disparity pixels are deemed valid or invalid. Certain disparity values may be deemed invalid because of image contrast anomalies, lighting anomalies and other factors. Steps 402, 404, 406 and 408 are performed within an off-the-shelf stereo image preprocessing circuit such as the Acadia I™ circuit.

At step 410, the multi-resolution disparity images are used to produce a depth map. The depth map (also known as a depth image or range image) comprises a two-dimensional array of pixels, where each pixel represents the depth within the image at that pixel to a point in the scene 104. As such, pixels belonging to objects in the image will have a depth to the object, and all other valid pixels will have a depth to the horizon or to the roadway (ground) in front of the vehicle.

To confirm that an object exists in the field of view of the stereo cameras 200 and 202, at optional step 412 a secondary sensor signal may be used for target cueing. For example, if the secondary sensor 204 is radar based, the secondary sensor 204 produces an estimate of the range and position of the object. The information from the secondary signal can be used to limit a subsequent template matching process to potentially valid targets.

Figure 5:
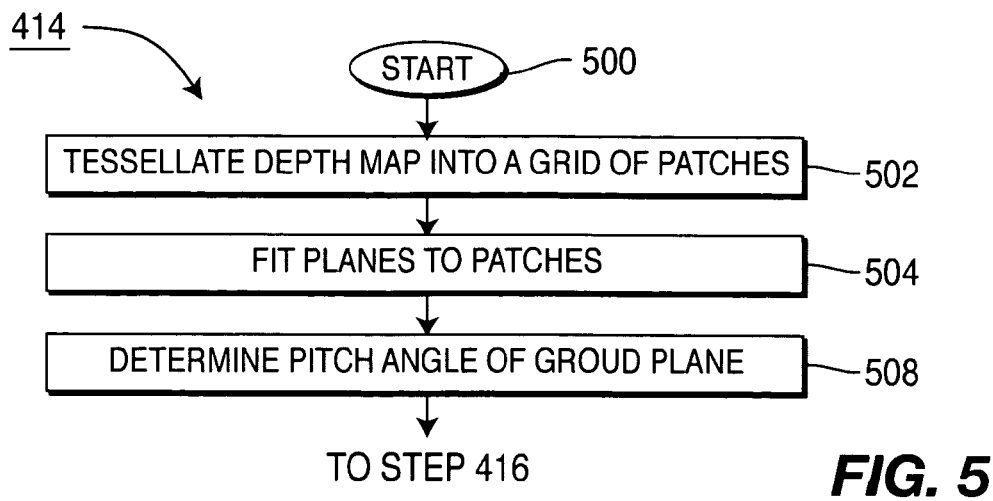
FIG. 5 depicts a method of locating the ground.
Figure 6:
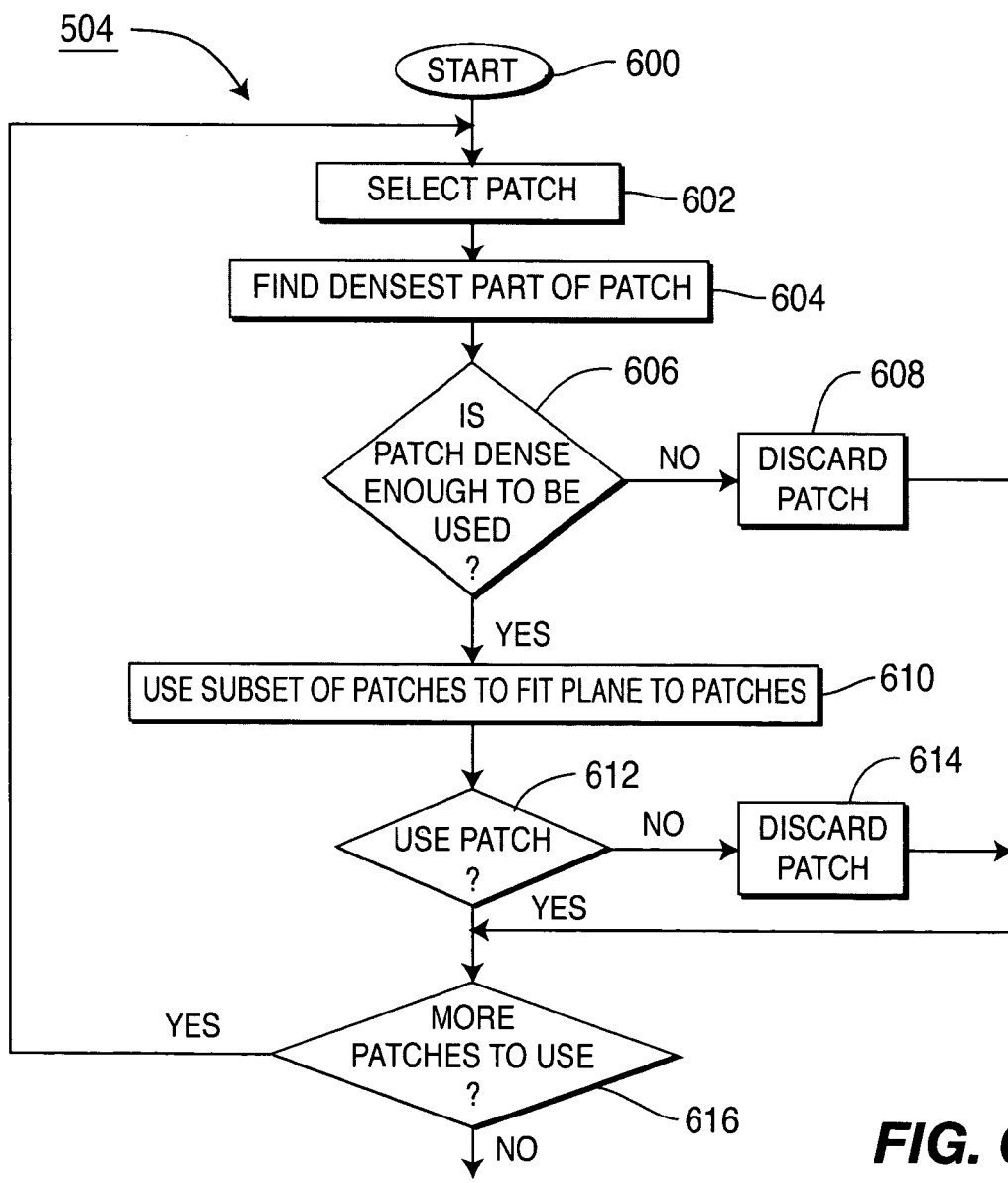
FIG. 6 depicts a plane fitting process.

After step 412, or step 410 if optional step 412 is not performed, the method 400 proceeds at step 414 by locating the ground. The method of performing step 414 is illustrated in FIG. 5. Step 414 starts at step 500 and proceeds at step 502 by tessellating the depth map into a grid of patches. Then, at step 504, planes are fit to the data points of each patch. Step 504 includes classifying the patches as is subsequently explained. The process of plane fitting is illustrated in FIG. 6. Plain fitting is an important step in generating plane normals, which are used to determine the ground. The process starts at step 600 and proceeds at step 602 where a patch is selected. Then, to mitigate problems caused by data insufficiency within the stereo data, at step 604 the patch is shifted locally to find the densest part of the stereo data in the nearby region of the original patch. This reduces the effect of "holes" in the stereo data that cause problems such as increased errors when plane fitting. Holes, which represent pixels that do not have valid 3D position estimates, are caused by specularities, lack of texture, or other factors in the stereo image data. The 3D positions of the pixels can also contain noise and outliers, sometimes severe, which can also cause problems. Readily identifiable noise and outliers can also be removed from the stereo data. Then, at step 606 a determination is made as to whether the patch is dense enough to be used. If not, at step 608, a patch without sufficient density is discarded. Thus, not all patches are used in ground detection.

Still referring to FIG. 6, at step 610, for each patch that is retained a subset of the stereo image data points for that patch is used for plane fitting and patch normal determination. For example, only pixels having depth values in the middle 80% of the overall range can be used. This eliminates possible outliers in the stereo data from skewing the results. Plane fitting starts by removing each patch's distance offset from the stereo data. This forces the resulting patch plane to be such that the 3D position (x, y, z) of any point in the plane satisfies the equation $ax+by+cz=0$, which is the desired plane equation having an origin at the patch center. Then, a plane is fitted through the selected subset 3D points of each patch to form the desired patch plane. The resulting patch plane is such that for all points:

$$Ax=0$$

where $x=(a, b, c)$ is the plane normal, and A is an N by 3 matrix with the 3-D coordinates with respect to the patch centroid, (x,y,z), for each point at every row. A least square solution of $Ax=0$ provides the patch's (surface) normal vector. A computationally efficient way to calculate the surface normal vector is to calculate the third Eigen-vector of the matrix $A^TA$, by applying a singular valued decomposition (SVD) to the matrix $A^TA$. Fast SVD algorithms exist for positive semi-definite matrixes, which is the case for the matrix of interest.

Once the plane normal is available, at step 612 a decision is made as to whether to use the patch in ground detection. That decision is based on the similarity of the patch's height and surface normal to the expected patch height of zero and vertical normal. To do so, each patch is classified by as:

a negative patch, if the patch has a negative height;

a ground patch, if the patch height is both below a threshold and has a vertical normal;

a faraway patch, if the patch distance is outside the scope of interest;

a high patch, if the patch height is outside the scope of interest;

a confusion patch, if the height is close to ground but has a non-vertical normal, or if the height is above the threshold but has a vertical normal;

a side patch, if the height is above the threshold and has a non-vertical normal; or a top patch, if the height is above the threshold and with an almost vertical normal.

Patch classification is based on the orientation of the patch (as determined by its plane normal), on its height constraint, and on it position. Classifying using multiple criteria helps mitigate the impact of noise in the stereo image data. The exact thresholds to use when classifying depend on the calibration parameters of the cameras 200 and 202 and on the potential threats in the scene 104. The confusion patches are often boundary patches that contain part of the ground. If the patch is not classified as a negative, ground patch, faraway patch, high patch, side patch, top patch or confusion patch, the patch is discarded in step 614. Otherwise the patch is considered a ground patch.

If the patch is considered a ground patch, at step 616 a decision is made as to whether there are any more patches to classify. If yes, step 616 returns to select another patch at step 602. Likewise, if patches are discarded at steps 608 or 614, step 616 is performed. When there are no other patches to process step 504 is complete.

Returning to FIG. 5, after step 504, at step 508 the pitch angle of the entire ground plane is computed as the average of each individual ground patch's pitch angles. That information is readily available from the patch's plane normal.

Referring now back to FIG. 4, once the ground is detected, at step 416 the depth map is corrected for the pitch angle. To do so, the data that depends on the stereo-camera-to-ground calibration can be adjusted so that the ground points have approximately zero height in world coordinates by adjusting the pitch angle to fit the ground plane. Then, the pitch-angle is used to warp the depth image pixels to match the original calibration coordinates. This can be performed relatively quickly in every frame. The result of warping is that even though the camera to ground plane calibration pitch is changing in every new frame, the depth image pixels that are used for template matching are always warped into the coordinate system of the initial reference calibration, and are effectively stabilized. Thus, the same original set of pre-rendered templates can be used for detection and tracking for every frame. It is possible to re-render the vehicle model templates used for matching against the depth image. However, due to the large number of templates in a typical ¼-meter by ¼-meter search grid this is computationally-intensive and may not be suitable for real-time operations. Another option is to index a new set of pre-rendered templates based on the pitch angle. In this case, it would not be necessary to correct the depth map for the pitch angle.

Additionally, at step 420, the actual ground can be removed from the depth map. Since objects always sit on top of the ground, target detection accuracy can be improved by removing depth map pixels that correspond to the ground plane. Removing those pixels will reduce false target detections, especially at closer ranges where ground detection is most effective, e.g., less than 18 meters from the stereo cameras 200 and 202.

After the actual ground is determined and the depth map is corrected for differences between the actual ground and an assumed ground (a calibration ground), step 422 searches a template database 306 to match pre-rendered templates to the depth map. The template database 306 comprises a plurality of pre-rendered templates, e.g., depth models of various types of vehicles or pedestrians that are typically seen by the vehicle. In one embodiment, the database is populated with multiple automobile depth models at positions in a 0.25 meter resolution 3-D volume within the scene in front of the vehicle. In this embodiment, the vertical extent of the volume is limited due to the expected locations of vehicles on roadways. The depth image is a two-dimensional digital image, where each pixel expresses the depth of a visible point in the scene with respect to a known reference coordinate system. As such, the mapping between pixels and corresponding scene points is known. Step 422 employs a depth model based search, where the search is defined by a set of possible target location pose pairs. For each such pair, a depth model of the operative target type (e.g., sedan, truck, or pedestrian) is rendered and compared with the observed scene range image via a similarity metric. The process creates an image with dimensionality equal to that of the search space, where each axis represents a target model parameter, and each pixel value expresses a relative measure of the likelihood that a target exists in the scene with the specific parameters.

Generally, an exhaustive search is performed. However, if the ground is removed in step 420 the exhaustive search is simplified. After matching, at step 424 a match score is computed and assigned to its corresponding pixel within a scores where the value (score) is indicative of the probability that a match has occurred. Regions of high density (peaks) in the scores image indicate the presence of structure in the scene that is similar in shape to the employed model. These regions (modes) are detected with a mean shift algorithm of appropriate scale. Each pixel is then shifted to the centroid of its local neighborhood. This process is iterated until convergence for each pixel. All pixels converging to the same point are presumed to belong to the same mode, and modes that satisfy a minimum score and region of support criteria are then used to initialize the vehicle detection hypotheses.

The match score can be derived in a number of ways. In one embodiment, the depth differences at each pixel between the template and the depth image are summed across the entire image and normalized by the total number of pixels in the target template. Without loss of generality, these summed depth differences may be inverted or negated to provide a measure of similarity. Spatial and/or temporal filtering of the match score values can be performed to produce new match scores. In another embodiment, the comparison (difference) at each pixel can be used to determine a yes or no "vote" for that pixel (e.g., vote yes if the depth difference is less than one meter, otherwise vote no). The yes votes can be summed and normalized by the total number of pixels in the template to form a match score for the image.

In another embodiment, the top and bottom halves of the pedestrian template are compared to similarly positioned pixels in the depth map. If the difference at each pixel is less than a predefined amount, such as ¼ meter, the pixel is deemed a first match. The number of pixels deemed a first match is then summed and then divided by the total number of pixels in the first half of the target template for which the template pixels have a valid similarly positioned pixel in the depth map, to produce a first match score. Then, the difference of each of the pixels in the second half of the depth image and each similarly positioned pixel in the second half of the target template are determined. If the difference at each pixel is less than a predefined amount, the pixel is deemed a second match. The total number of pixels deemed a second match is then divided by the total number of pixels in the second half of the template to produce a second match score. The first match score and the second match score are then multiplied to determine a final match score.

At step 426, a query is made as to whether another template should be used for matching. If so, a loop is made back to step 422 for selection of another template. The templates are iteratively matched to the depth map in this manner in an effort to identify the object or objects within the scene.

In one embodiment, during the template matching process, the process speed can be increased by skipping ahead in larger increments of distance than typically used depending upon how poor the match score is. As such, normal distance increments are ¼ of a meter but if the match score is so low for a particular template than the distance may be skipped in a larger increment, for example, one meter. Thus, a modified exhaustive search may be utilized.

When the template search is complete, the method 400 continues at optional step 428 wherein a secondary sensor is used to confirm that an object does exist. As such, once a target is identified, the secondary sensor information may be compared to the identified target to validate that the target is truly in the scene. Such validation reduces the possibility of a false positive occurring. During step 428, a target list from the vision system is compared against a target list developed by the secondary sensor. Any target that is not on both lists will be deemed a non-valid target and removed from the target lists.

At step 430, the target size and classification is estimated by processing the depth image to identify the edges of the target. The original images from the cameras may also be used to identify the boundaries of objects within the image. In this case, the original images may be warped to correct for the pitch angle. Since there are typically many more pixels in the original image than in the coarser multi-resolution pyramid depth images used for target detection, it may be desirable to approximate this warping by a vertical image translation for computational efficiency. The size (height and width) of the target are used to classify the target as a sedan, SUV, truck, pedestrian, etc. At step 432, the target and its characteristics (boundaries) are tracked across frames from the sensors. A recursive filter such as a Kalman filter may be used to process the characteristics of the targets to track the targets from frame to frame. Such tracking enables updating of the classification of the target using multiple frames of information.

At step 434, if required, the method performs a pre-crash analysis to enable the host vehicle 100 to make adjustments to the parameters of the vehicle to mitigate or eliminate damage or injury. Such processing may allow the automobile's attitude or orientation to be adjusted (e.g., lower or raise the bumper position to optimally impact the target) the air-bags may be deployed in a particular manner to safeguard the vehicle's occupants with regard to the classification and velocity of target involved in the collision, and the like. The method 400 then stops at step 436.

While the foregoing is directed to embodiments of the present invention, other and further embodiments of the invention may be devised without departing from the basic scope thereof, and the scope thereof is determined by the claims that follow.

The invention claimed is:

1. A method of performing vision processing comprising:
stereo imaging a scene about a platform to produce stereo image data;
producing a map of data from the stereo image data, wherein the map is based on an assumed ground plane;
identifying an actual ground plane using the map;
compensating the map for differences between the actual ground plane and the assumed ground plane; and
removing the actual ground plane from the map.

2. The method of claim 1 further including the step of comparing a plurality of templates to the map to identifying a match between the map and at least one template.

3. The method of claim 2 further including the step of adjusting a parameter of the platform in response to a match.

4. The method of claim 3 wherein the parameter of a vehicle comprises at least one parameter selected from the group of: an air bag deployment parameter, a seatbelt parameter, a vehicle height parameter, and a vehicle velocity and/or acceleration control parameter.

5. The method of claim 3 further including accessing at least one template from a database comprising a plurality of templates.

6. The method of claim 2 wherein the comparing step includes determining a difference between each pixel in the map and each similarly positioned pixel in a template, and determining that a pixel is a match if the difference at each pixel is less than a predefined amount.

7. A computer readable medium storing a vision system program that controls a computer to:
produce a depth map from input imagery;
determine an actual ground plane from said depth map;
correct the depth map based on the actual ground plane;
detect a potential threat in said corrected depth map;
estimate a size of said detected potential threat;
estimate a position of said detected potential threat;
estimate a velocity of said detected potential threat;
perform a trajectory analysis of said detected potential threat using said estimated position and said estimated velocity;
perform a collision prediction based on said trajectory analysis; and
determine if a collision is imminent based on said collision prediction and on said estimated size of said potential threat.

8. The computer readable medium of claim 7 that further controls a computer to remove the actual ground from the corrected depth map.

9. A collision avoidance system comprising:
a collision detection system comprising:
a stereo camera pair for producing imagery of a scene;
a stereo image preprocessor for preprocessing said imagery;
a map generator for producing from said preprocessed imagery a map referenced to an assumed ground plane; and
a target processor for determining the actual ground plane from said map and for removing that ground plane from said map.

10. A computer readable medium storing a vision system program that controls a computer to:
produce a depth map from input imagery;
determine an actual ground plane from said depth map; and
removing the actual ground from the depth map.

* * * * *